US006687736B1

(12) United States Patent
Lee (10) Patent No.: US 6,687,736 B1
(45) Date of Patent: Feb. 3, 2004

(54) LOCALIZATION SUPPORT METHOD FOR SOFTWARE APPLICATIONS WITH BACKEND DATABASE

(75) Inventor: Elliott Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 657 days.

(21) Appl. No.: 09/666,028

(22) Filed: Sep. 20, 2000

(51) Int. Cl.[7] .......................................... G06F 13/100
(52) U.S. Cl. ........................................ 709/203; 704/8
(58) Field of Search ............................. 704/1, 2, 3, 4, 704/7, 8, 9; 709/200, 203

(56) References Cited

U.S. PATENT DOCUMENTS

| 5,434,776 | A | | 7/1995 | Jain ........................ 364/419.1 |
| 5,442,782 | A | | 8/1995 | Malatesta et al. ........... 395/600 |
| 5,664,206 | A | | 9/1997 | Murow et al. ................. 704/8 |
| 6,092,035 | A | * | 7/2000 | Kurachi et al. ................ 704/3 |
| 6,615,168 | B1 | * | 9/2003 | Resnik et al. .................. 704/8 |

* cited by examiner

Primary Examiner—Robert B Harrell
(74) Attorney, Agent, or Firm—Sierra Patent Group, Ltd.

(57) ABSTRACT

A server application program is disclosed that runs on a server and provides a client with multilingual support, but does not have a multilingual database on the server and does not need to access a remote multilingual database as the application program is running. The server application program, having at least one module written in an interpreted language, interacts with locally available language module files. These files contain extracts from multilingual databases, but are formatted to be read as variables containing text strings by the interpreter used in conjunction with the sever application module written in an interpreted language. This allows extremely fast and dynamic access to a set of multilingual text strings, providing multilingual support of an application on a server with significantly greater speed and versatility than previous designs.

23 Claims, 8 Drawing Sheets

Server Application Program According To The Present Invention

Figure 1
Prior Art Multilingual Support
Client, Server, And Database

Figure 2
Display Page

Figure 3
Server Configuration According To The Present Invention

Figure 4
Server Application Program According To The Present Invention

Figure 5
A First Multilingual Support System
According To The Present Invention

Figure 6
A Second Multilingual Support System
Accord To The Present Invention

Figure 7
Flowchart According To
The Present Invention

Figure 8 Flowchart According To The Present Invention

LOCALIZATION SUPPORT METHOD FOR SOFTWARE APPLICATIONS WITH BACKEND DATABASE

BACKGROUND OF THE INVENTION

1. Field of the Invention

This invention pertains generally to software application programs requiring multiple language support. More particularly this invention is directed to an improved system and method for providing multiple language support to an application having a remote language database.

2. The Prior Art

Application programs that are expected to be used by persons speaking different languages require multiple language support. This requirement falls on all applications having any type of user interface, from older character-cell based user interfaces to the most current graphical display user interfaces. In each case, there will be text displayed that must be in the language of the user. In some cases multiple languages will be in use at the same time.

Initially application programs were rewritten for each target language. This solution required a separate code base for each target language. Having multiple code bases for a single application creates problems. Considerable logistical complexity is created when there are multiple code bases. Multiple code bases also create significant maintenance problems because of the coordination and propagation of changes between multiple parallel development efforts. The separate code base solution proved prohibitively expensive for continuing multilingual distribution of applications.

The next solution in providing multilingual support avoided the multiple code base problems by introducing a single code base with different software modules that contained language text strings. Text strings, and other variables used by the program, are all placed in one location. This location, a separate module and often a separate file, gets compiled into the final program and contains text strings for all the places in the user interface that have textual portions in the display. Files containing variables needed during the execution of a program are sometime called environmental files, and generally contain data that is expected to be changed during the life of the program with more frequency than the code base. Depending on the application text strings where kept in separate modules, files, or with other data in environmental files.

In the case of providing different language support, modules would include text strings from one or more languages that are to be used in the user interface, or could have a different language module for each supported language. These files are then built-in to the application program by being part of the program build, or being in the complied version of the program. Thus, the application is built using specified language modules or files whose contents may vary depending on the compiled program's target audience.

The physical topology of computer systems used for the two multilingual support solutions just discussed were the large, centralized computers predominant one to two decades ago. In such installations there would be a computer or set of computers in a centralized location, examples being IBM 360s or CDC Cyber 6000s. User interface equipment consisted of hardwired terminals, coupled with the central computers using MUXes and similar equipment. As a result of the physical architecture, all the software on this system is colocated with the central computer or computers. Everything from the operating system to the application is on one machine or a closely coupled set of machines in close physical proximity with dedicated high-speed system interconnects.

As network technology matured typical system topology evolved, changes began occurring in typical systems topologies, especially at the front-end connections to the traditional computer rooms. There was still a central computer or cluster of computers which typically had a relatively large amount of secondary storage, including any databases, connected directly to the centralized computers. Example computers would include mainframes such as DEC VAX 8000 series or IBM 390 series, or "midi" machines such as DEC VAX 6000-series. The significant changes were occurring at the system's front-end. Terminals were now typically connected through a LAN rather than through dedicated terminal connections. An example of such a connection is DEC's LAT protocol running on an Ethernet-based LAN. In addition small local LANs having a relatively small number of individual systems, mostly IBM PC's or clones running some version of MS-DOS, were connected through the LANs to the centralized systems. Applications were typically terminal emulators with character-cell based applications, or with very limited graphics.

The physical system topology just discussed had the property of maintaining large or complex application programs on the central computer systems because the smaller systems didn't have the computing capability nor the storage capability to run larger applications. Networks were relatively slow, and the user interfaces where virtually all character-cell based.

Referring again to multilingual support for software that was evolving along with the hardware, the use of a single code base with language modules took care of the maintenance problems found with multiple code bases. Other limitations still existed, however. When language modules are compiled into an application, changes to the language files require recompiling and reinstalling the program. Thus when changes occurred the program would have to be stopped, perhaps uninstalled, and the newly compiled version installed. In addition to being a fair amount of work for the system administrators, this necessitated periods of time when the application wasn't available ("down-time"). Down-time was expected, even if barely tolerated, when most applications ran on main-frames inside of computer centers. The issue became increasingly problematic as the availability of smaller, individualized, local systems came into increasingly common use. As more machines were being used by people not disciplined or tolerant in the ways of the centrally controlled main-frames with their scheduled downtimes, users pushed for no down time. No down-time is often characterized by the system's availability in hours (up to 24) and days (up to 7); no down-time corresponds to all-hours, all-days availability or 24×7 availability.

At the same time, application developers were making increasing use of databases to support multilingual applications. This meshed with the increasing need for 24×7 availability for applications having multilingual capabilities. Using a database allows the application to stay up regardless of what was happening to the database. It allows for changes to be made to the database independently from the running application, and allowed very substantial changes to made to the data stored in data bases without affecting the running application. If a switch-over from one set of data to another was needed, it could be accomplished in a few minutes rather than the hours re-installing the application might take.

Using databases in conjunction with an application requiring multilingual support provided the kind of functionality and availability not found in previous solutions, and is presently in use. With the growth of the internet such support is even more critical now, as there can be dynamic requests for different languages (in the past there would typically be one language used per session) within a single page or session, and availability of application available on the internet must be as close to 24×7 as technology can get.

Figure 1:
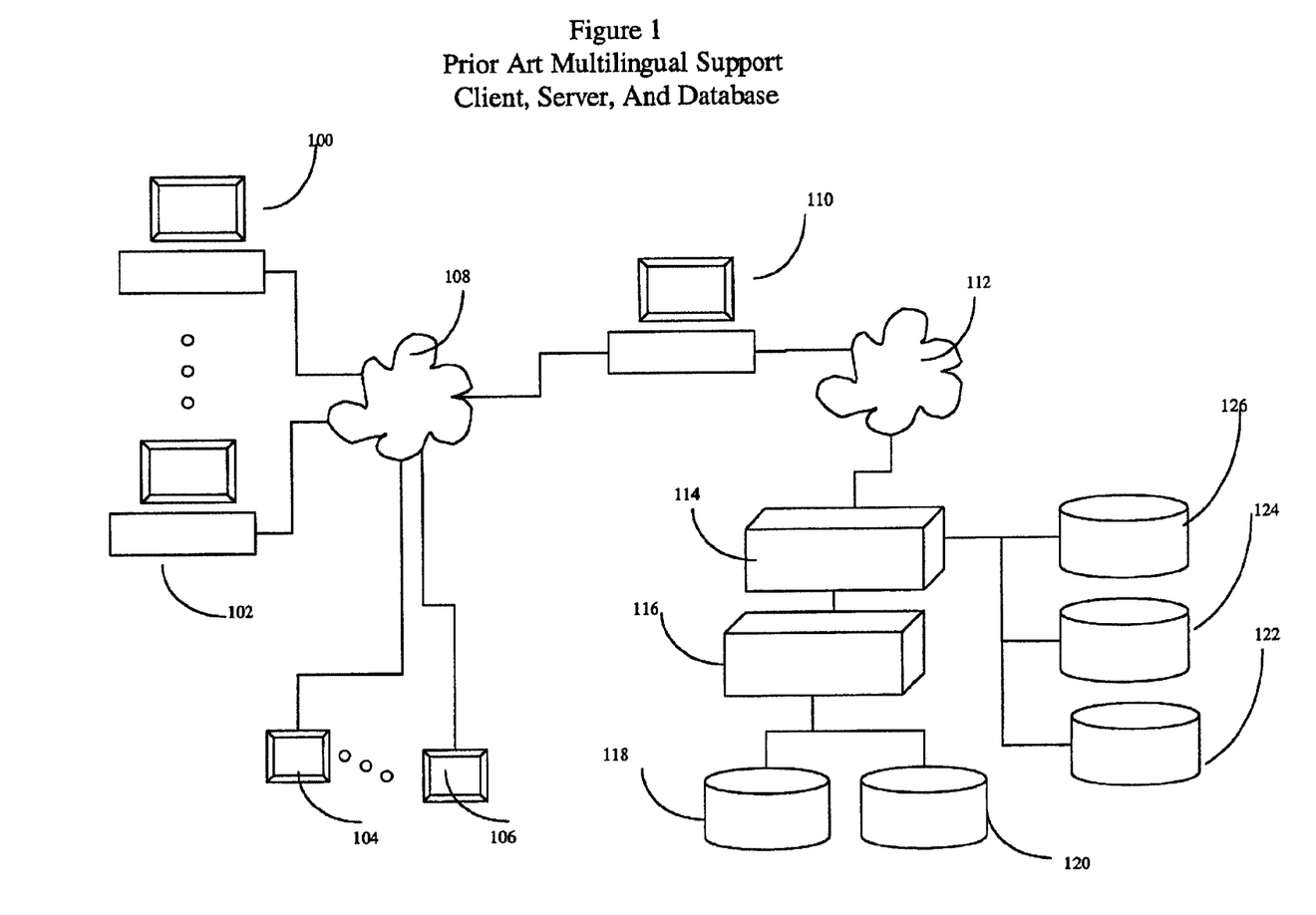
FIG. 1 is a block diagram of prior art distributed system.

The physical topology of a typical system that corresponds to the distributed multilingual support just described is shown in FIG. 1. It developed in parallel with the propagation of client-server applications and the tremendous expansion in the internet. The terminals used with centralized system topologies are no longer present. Instead, a client application is running on a client computer system shown as systems 100 and 102, or client a device shown as 104 and 106. Client machines are those known and standard in the art, including but not limited to IBM personal computers or IBM-PC clones running Microsoft Windows or NT running a standard web browser such as Internet Explorer or Netscape Navigator. Client devices include, but are not limited to, web connected phones which also have net interfaces and proprietary web browsers, or devices such as web-enabled televisions. When referring to clients in this disclosure, it will be understood that this includes machines and devices including but not limited to those just described. Clients or client devices include both the hardware and software of the device that is making a request through a network to a server.

Clients are operably connected to a network in standard ways well known in the art, including internet, WAN, or LAN interfaces. Network 108 is shown as a cloud, indicating it includes the interfaces and transport mechanisms well known in the art. Additionally, any number of clients may be connected to network 108, including more client systems as shown by the ellipses between client systems 102 and 104, and more client devices as indicated by the ellipses between client devices 104 and 106.

Server system 110 is also connected to the network 104 in ways well known in the art, including standard LAN, WAN, and internet connections. Server system 110 as a whole is of conventional design using well known components, including a hardware base and an operating system such as a Sun Microsystems Ultra 10 Model 333 Workstation running the Solaris v.7 operating system, and includes a server application program running on the system such as a web server. Technical details of the example system may be found on Sun Microsystems' website.

The server application program may be a compiled program written in a language such as C, C++, or other well known language, or an interpreted application written in a language such as Perl. For the purposes of this disclosure when referring to a server it means a server system as just described including a standard hardware base, a standard operating system, and having the capability to fully support a server application program running on the server system so that the server application can make full and normal use of the system interfaces to the network 108 to which it is operably attached.

As is now common, server 110 is remotely located from database machines 114 and 116. Typically the database machines will be rackmounted and in close physical proximity to disk arrays, shown as disks 118 and 120 coupled to database machine 116, and disks 122, 124, and 126 coupled to database machine 116. Close physical proximity allows higher-speed connections to be made for better overall throughput, as is well known in the art. In larger companies or companies serving a large number of clients, there will be many servers in addition to the single one shown for illustrative purposes. The server application running on server 110 will access database machine 114 and/or 116 over network 112 as it needs to retrieve language-specific display fields for portions of any given user display.

Figure 2:
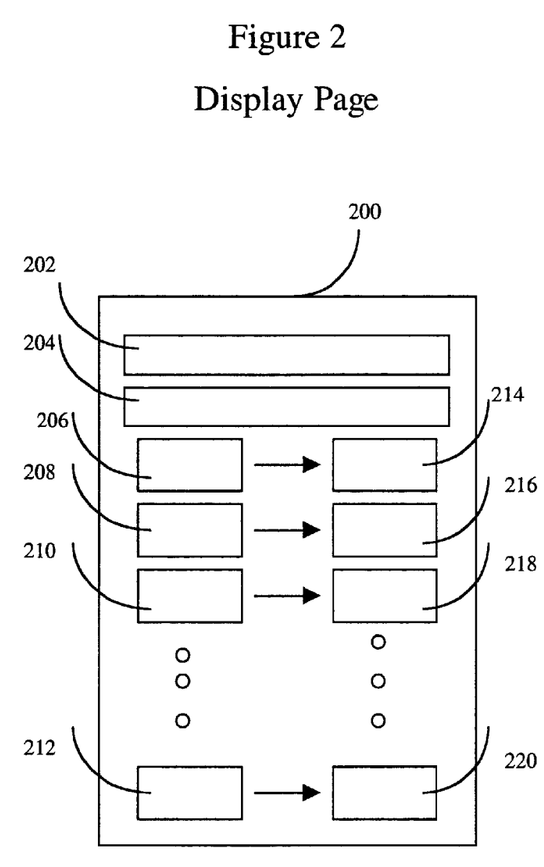
FIG. 2 is a block diagram of a typical user display.

Recently, the demands the server application program on server 110 makes on database machines 114 and 116 have increased significantly. This is due to several factors, but in particular the tremendous increase in the use of web-based servers which are typically accompanied with display pages having considerably more complexity than previous user interfaces. Even a simple user interface display page, shown as 200 in FIG. 2, can involve considerable text retrieval. Page 200 has two title fields, 202 and 204, each typically having multiple text strings at the top of the page. In addition there are a series of user-interactive fields with text strings in each shown as 206, 208, 210, and 212, with there being any practicable number of additional fields between 210 and 212. Fields 214, 216, 218, and 220 contain text strings that change according to the input provided by the user. There may be any practicable number of fields between 218 and 220. Each of the fields just listed will require server 110 to retrieve individual text strings from database machine 114 over network 112. In addition to the text string retrievals needed to initialize the page, as the user interacts with display fields 206 through 212 text strings will need to be continuously retrieved from database machine 114 for both the changing options in text fields 206 through 212 and the text in the fields coupled to the user input fields. As the user continues to interact with the server via the client, the network traffic and related delays in response between server 110 and the database machines 114 and 116 will continue.

Typically server 110 would not have the capability to handle the database on database machines 114 and 116. There are several critical reasons why server 110 cannot have a full database as exists on database machine 114 and 116. One is secondary storage considerations. Server 110 would typically not have enough secondary storage to download an entire database, as its primary function is to run server applications which require, overall, less secondary storage than database applications. Adding additional secondary storage is often not an option because of the extra space, cost, and complexity associated with the amount of storage a reasonably sized database would need. It is desirable that servers not be required to be directly connected to large disk arrays. Another critical reason servers do not have entire databases on them is based in system resource allocation. Servers need to be tuned to provide maximum throughput to clients who have outstanding requests. Resource contention within a server needs to be skewed towards its primary function, serving clients, at the expense of contending jobs such as a database manager if one were to be installed on server 110. This includes network I/O resources and bandwidth as well as peripheral storage throughput considerations.

Thus, at a time when it is necessary that the typical server be remote from the database machine, the number of interactions between the server application and the database machine is steadily rising. The results of this have probably been noted by most web-server users—it can take a noticeable amount of time for a page to complete as it retrieves portions of its display. And is typical of current implementations, text string retrieved for current use are associated with specific fields in a specific page and are "lost" (released, no longer used) after a new page is invoked or after a relatively short time period. Although there may be delays at several steps or links in the overall connection, it is now the case that the traffic between server 110 and database machine 114 over network 112 accounts for a measurable portion of it. This problem will continue to worsen as additional demands are made on servers.

Given the ever increasing demand on servers and the associated increase in database retrievals and the accompanying network traffic, there is an urgent need to find efficient ways of reducing the number of accesses a server makes with the database machine where text strings reside. This must be accomplished while maintaining the server and database machines as separate systems carrying out there primary tasks.

It is therefore a goal of this invention is to provide a method and system for reducing the amount of traffic between a server application and its associated database machine while providing dynamic multilingual support.

BRIEF DESCRIPTION OF THE INVENTION

The present invention provides a system and method of use that allows a server application program to provide multilingual support to client programs without the need to be in regular contact with a remote multilingual database. The system includes a server and a server application program running on the server, where the server application program is designed to use language module files that are local, that is, can be accessed without going over a network. The language module file or files are specifically formatted to allow an interpreter to load them in as text string variables when a server application written in an interpreted language is being run. This provides both dynamic loading and use, unusually fast response, and freedom from the remotely located multilingual database.

The server application program determines the language being requested by the client by first parsing though the client's request and looking for an explicit language indicator. If there is no explicit language request, the server application program will use a default language. The server application program may also make use of a history of language usage that corresponds to this request, session, or client. Such a history may be quite simple and limited for smaller applications and consist of a single default language choice. It may also be quite complex, keeping histories of clients and sessions that allow reasonably complicated heuristic searches to be performed to determine a language choice. As is well known in the art, any individual request from a client is part of a session (there may also be more than one session with a single client, depending on the client device). The methods used will depend on the complexity of expected use of the server application program, and the types and kinds of clients expected in each case.

As an option, the server program will generate requests for language module files from the multilingual database after determining a language requested by a client cannot be satisfied with locally available language module files. After receiving a language module file from a remote multilingual database, the server application program will make use of them locally.

DETAILED DESCRIPTION OF PREFERRED EMBODIMENTS

Person of ordinary skill in the art will realize that the following description of the present invention is illustrative only and not in any way limiting. Other embodiments of the invention will readily suggest themselves to such skilled persons having the benefit of this disclosure.

When viewing the figures, it is intended that similar designations used in this disclosure are intended to designate substantially similar matter.

The present invention addresses the need to reduce delays over a network connecting a server to the server's multilingual database, when the multilingual database is remote to the server.

Figure 3:
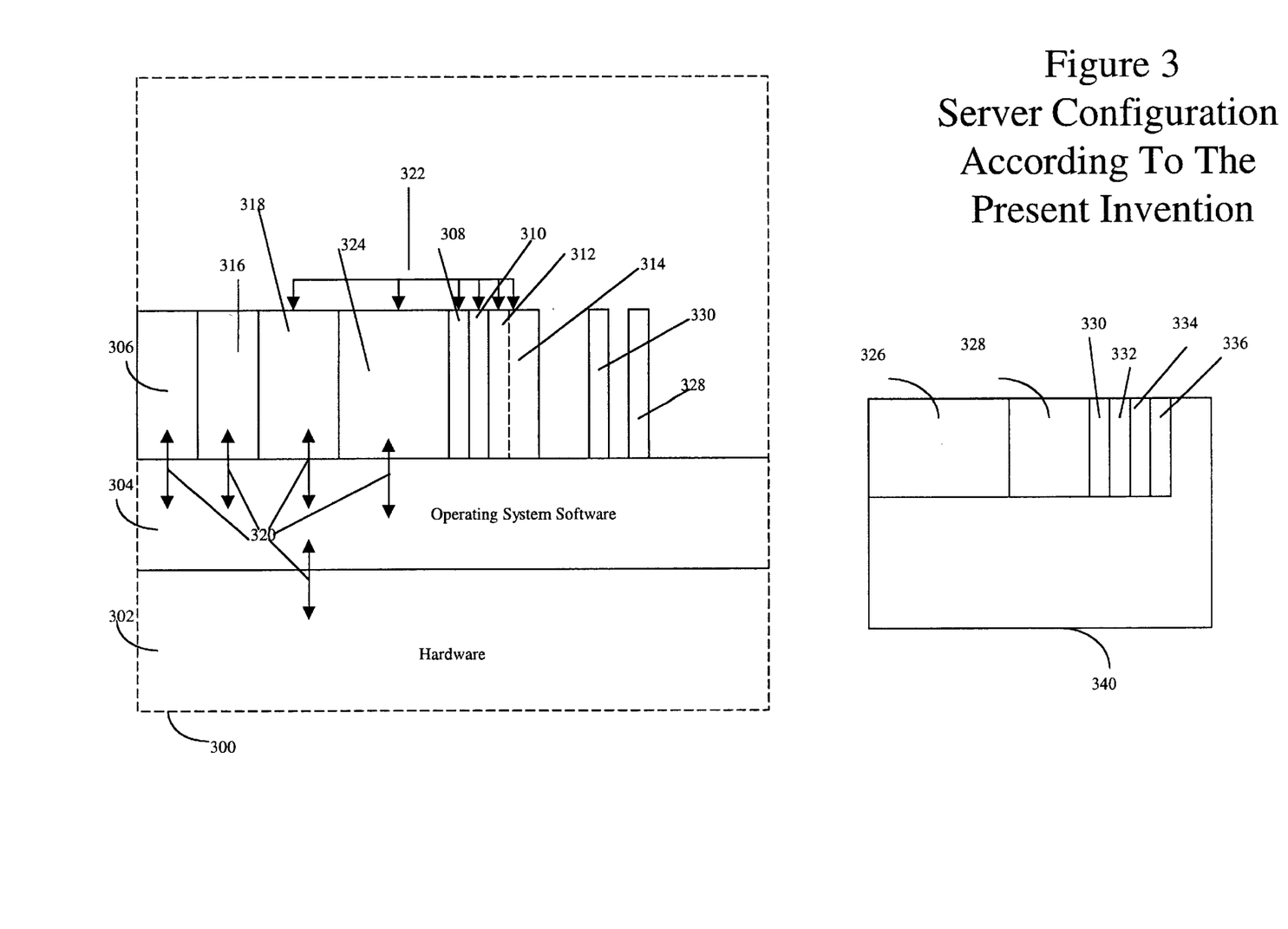
FIG. 3 is a block diagram of a server according to the present invention.

FIG. 3 shows a block diagram of a server according to the present invention. Server system 300 has a hardware base 302 and an operating system 304. These two components are of conventional design using well known components and are exemplified by a Sun Microsystems Ultra 10 Model 333 Workstation running the Solaris v.7 operating system. On top of operating system 304 are various applications, shown as 306, 316, 318, and 324. The arrows indicated by 320 show the parts of the system that are directly interacting with each other. Operating system 304 is continually interacting with hardware 302 as well as each of the applications 306, 316, 318 and 324. The application programs 306, 316, 318 and 324 make use of system services, system resources, and hardware resources through operating system 304.

Application 318 is a server program according to the present invention. Overall, the server program is written to be responsive to requests from clients, providing information and feedback of any type that may be included in a server program. This could include anything from simple information requests for numeric or textual information on the server, to complex interactive server programs such as the high end of web-servers or games. The actual implementation of a server according to the present invention may be implemented in a traditional compiled language such as C or C++, or may be implemented in an interpreted language such as Perl. As will be appreciated by one of ordinary skill in the art and with the benefit of the present disclosure, the server program may be implemented in any number of ways and with considerable variance in functionality while still encompassing the inventive nature of the present disclosure.

Continuing on in FIG. 3, server application program 318 makes use of a Perl program 324. Perl, being an interpreted language, requires that the Perl interpreter be read into memory at the same time, 308. Perl program 324 is read by Perl Interpreter 308, creating a machine readable and executable file 310. At this point another file is created, containing state information, configuration variables, and other variables, shown as 312.

There are also a set of language modules, shown as 328 and 330. There may be any number of language modules; only two are shown for illustrative purposes. The language modules contain formatted strings of text, exported from a language database. The modules may contain strings in more than one language. The language modules are kept on the server locally, having been generated at an earlier time using a central database.

It is possible to make requests of the language database and generate language module files when needed, as would be the case for unusual language requests. The contents of such a language module file will be specified by the server program of the current invention, but is an optional component explained more fully below.

When language strings are needed by server program 318 which is running an interpreted language application 324, having previously called in the appropriate interpreter 308, interpreter 308 reads the needed language modules 328, 300, parses them, and then enters the lines of text found in the language modules as variables into text string variable area 314. Text string variable area 314 is contained in state and general variable file 312, shown as a separate area for clarity. The text strings, stored as variables, are now ready to be used and can accessed with extreme rapidity as individual variables by the interpreted application.

Continuing with FIG. 3, the server's main memory is shown as 340. 326 is memory space taken up by the operating system. 328 is the main memory space occupied by the server application program according to the present invention. The appropriate interpreter for the application program written in an interpreted language is shown as 330. The machine readable and ready to execute application, generated by interpreter 330, is shown as 332. A file containing state information and various sets of variables, including localized text variable strings, is shown as 334. A language module is shown as 336, which provided the text strings for the localization variables in variables file 334.

Language modules, shown loaded into main memory as 336, are memory resident while being accessed by the interpreter. After the interpreter extracts the text strings contained in the language module and builds them into the set of variables available in variable file 334, it will typically not remain memory resident, as its use is completed and memory space is needed for other files, programs, etc. Those of ordinary skill in the art and with the benefit of the present disclosure will be able to see any number of ways of determining which language modules to copy into main memory and when, and then when to free up the space taken by language module 336 in main memory.

Figure 4:
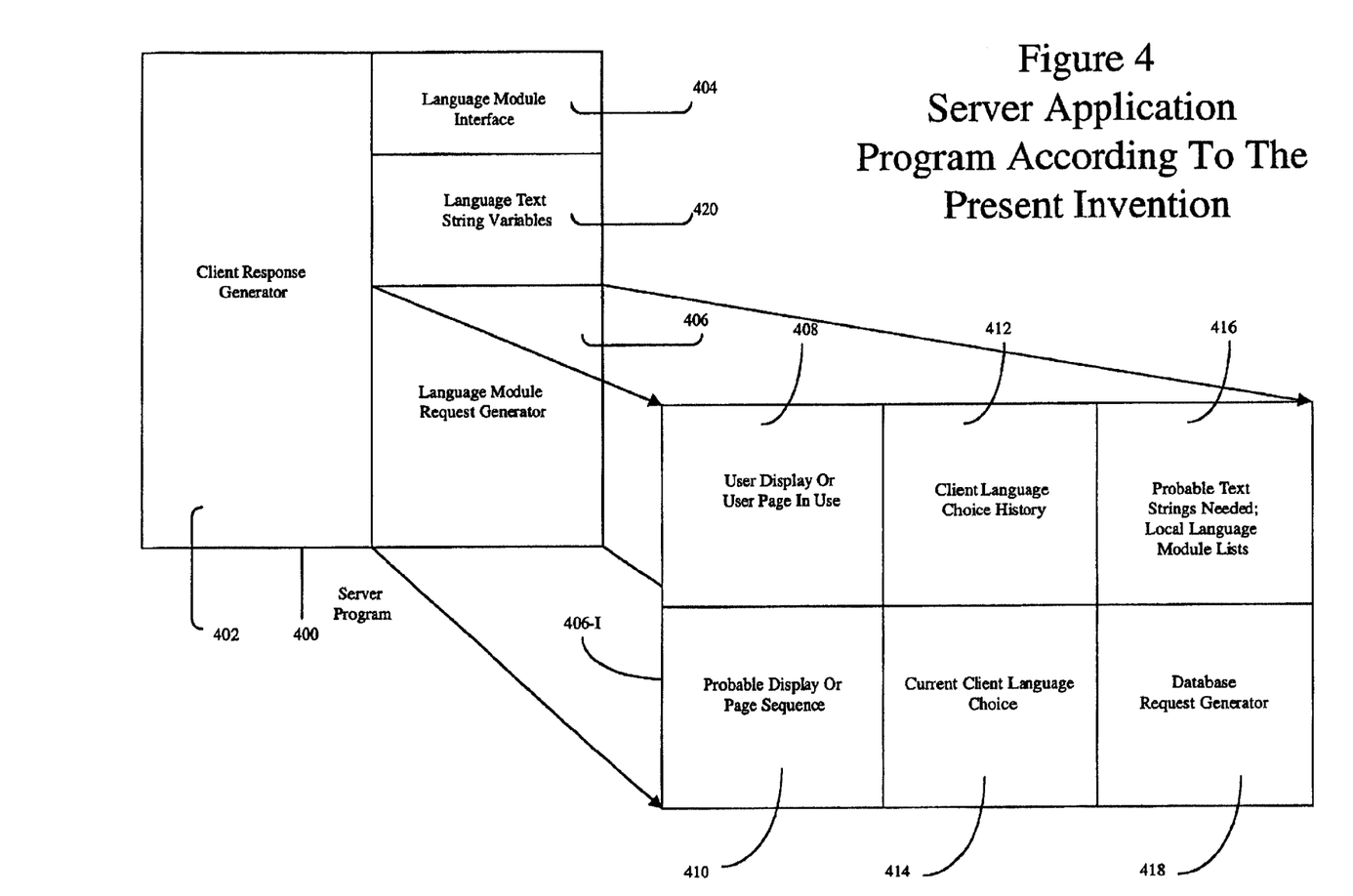
FIG. 4 is a block diagram of a server application program according to the present invention.

FIG. 4 shows server application program 400 containing a language module interface 404 and a language module request generator 406. Language module interface 404 is the portion of server application program 400 that interfaces with language module files once they are read into local memory. Language module interface 404 knows where the file is and how to access its contents, and extracts the contents of the language module for inclusion into the set of variables being used by an interpreted application program, prompted by client response generator 402 to retrieve desired text strings for specific client requests. Once language module interface 404 has read the text string variables and made them available to the interpreter for inclusion as local variables in an executable image, the language module file is no longer needed.

Language module request generator 406 generates language module requests that can be understood by the server's multilingual database machine. This module is an optional module, and is not expected to be included in base systems or systems with limited capacity interfaces (such as ATMs and other user-accessible limited-function interface machines) where the number of screens and text strings on the screens are relatively limited when compared to, say, a general purpose internet server application. Language module request generator 406 is shown in more detail at 406-I, language module request generator internals.

Language modules requested by language module request generator 406 can be constructed in a number of ways. One set of construction request modules according to the present invention is shown in block 406-I. The data to extract from the multilingual database is determined by a combination of criteria. Program module 408 keeps track of the current user display or user page, or in some cases data requests, and determines what text strings are needed to fulfill any or most of the choices on the current display. Program module 410 makes a deterministic or heuristically-based assessment of the likely sequence of display or pages that may be used in the current session based on current and recent past usage. Program modules 412 and 414 keep track of language usage history and current language choice or choices (there may be more than one language in use at one time, depending on the client's requests). Program module 416 makes use of the data generated by modules 408 through 414 to make an assessment of the text strings that are and will most likely be needed in order to serve both current client requests and probable near-term future client requests. It also knows which language modules are local, and if the requests can be fulfilled using the local modules. Program module 418 uses the output of program module 416 to format a request that can be understood by the server application program's multilingual database. This includes both data extraction from the database and output file formatting information.

It will be appreciated by persons of ordinary skill in the art and given the benefit of the present disclosure that server application program 400, language module interface 404, and language module request generator 406 can be implemented in a number of ways. Readily discemable implementations include writing additional code modules implementing language module interface 404 and language module request generator 406 and building them into an existing server application program using one of the standard languages such as C or C++, to a new implementation having language module interface 404 and language module request generator 406 embedded in other modules written in an interpreted language such as Perl. It is contemplated that the inventive features of the current invention encompass these and other implementations that will come to mind to those of ordinary skill in the art with the benefit of the present disclosure.

Figure 5:
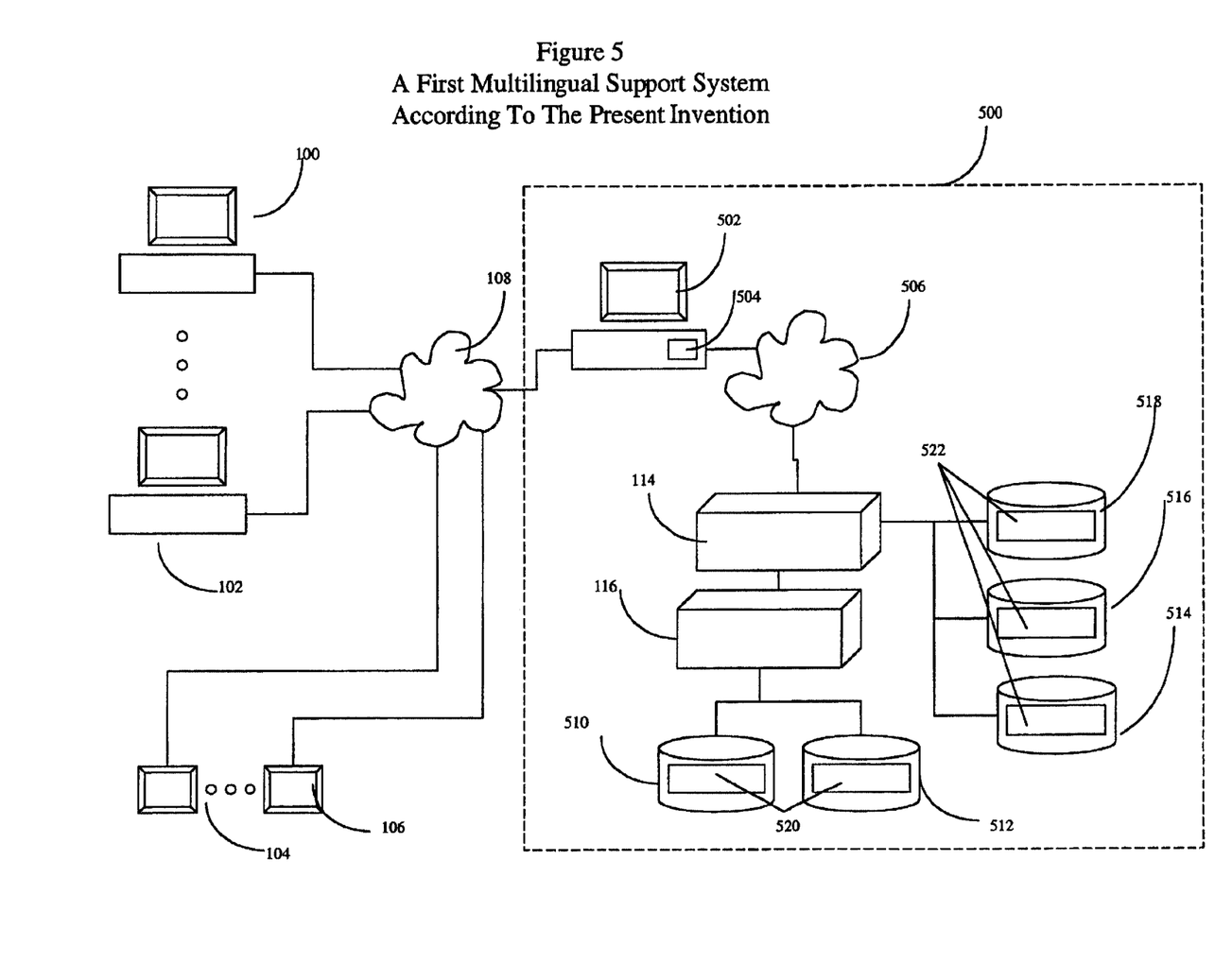
FIG. 5 is a block diagram of a system according to the present invention.

FIG. 5 shows a system according to the present invention. Client systems 100 and 102, and client devices 104 and 106 are of standard design using well known components as described earlier. Each is running a client program which, through network 108, makes requests of server 502. A multilingual system is disposed within system 500. Server 502 and server application program 504 together include the components discussed in FIGS. 3 and 4, including language modules, a language module interface module, and a file having a set of variables of which a subset will be text string variables for use by the interpreted language in which an application is written, extracted from local language module files. There may also be, depending on the installation, a language module request generator in communication with multilingual databases 114 and 116.

Although it is expected that the majority of applications using the present invention will involved remote clients, it is also possible to configure a client on the same physical machine as the server.

Server 502 is operably connected to network 506 in ways standard in the industry and according to the needs of the particular installation. The range of possible connection topologies and related protocols includes but is not limited to WANs, open LANs, virtual private networks or LANs, dedicated LANs, and interfaces to and the ability to work over the internet. The origin of the multilingual language module files used on server 502 are shown as database machines 114 and 116, on which a database management application runs. Depending on the application, these files may have been generated at any time previous to their use (from seconds to years), and may include anything from the entire contents of the multilingual database (for limited applications) to a small subset of the available text strings in the database. Disk 510 through 518 have portions of the current database on them as indicated by 520 and 522, as well as a portion of the data in the databases being on 502.

Figure 6:
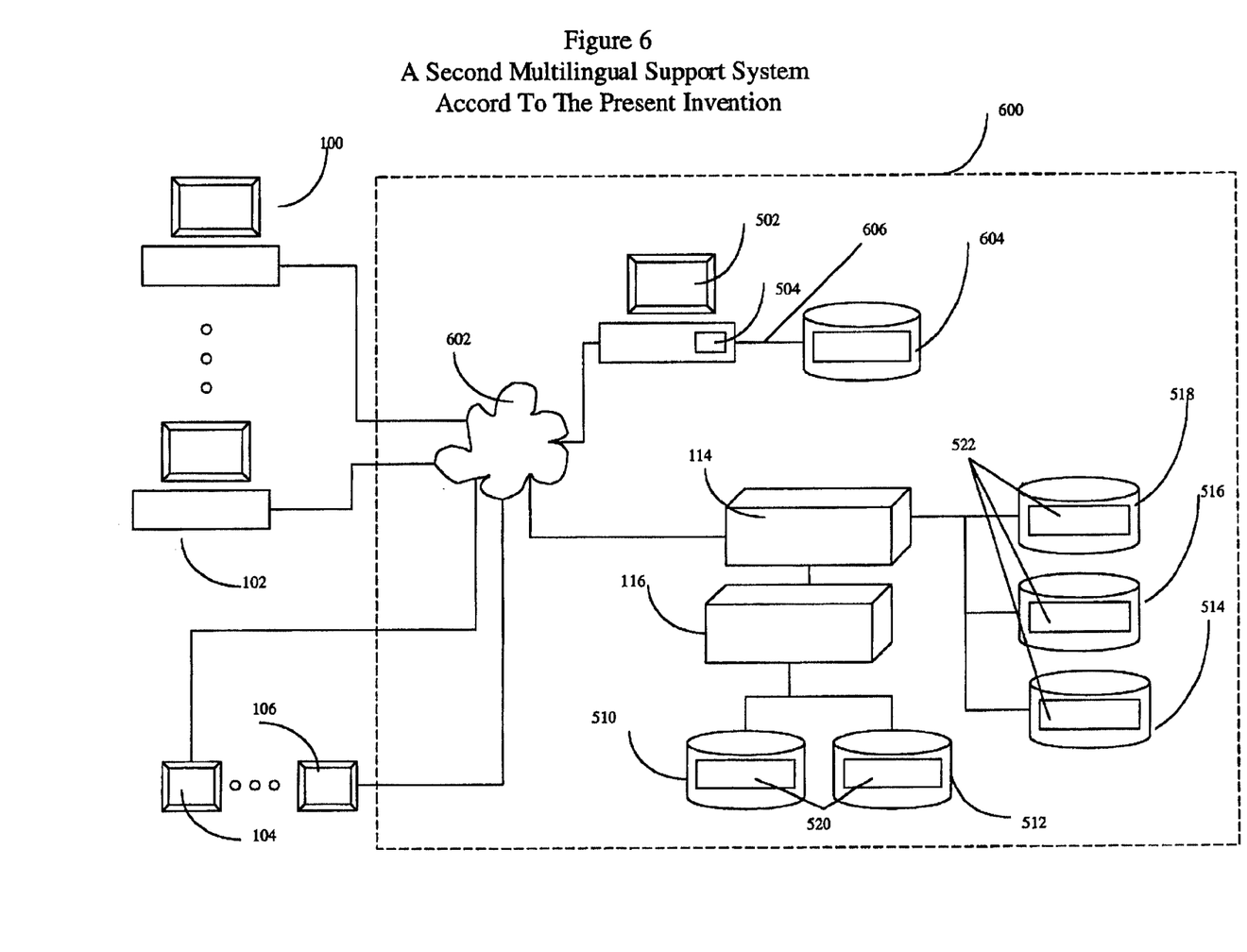
FIG. 6 is a block diagram of a second system according to the present invention.

FIG. 6 shows a second multilingual support system according to the present invention. Client systems 100 and 102, and client devices 104 and 106 are of standard design using well known components as described earlier. Each is running a client program which is connected through network 602. The client's connection to network 602 is carried out using methods well known in the art. A multilingual system is disposed within system 600. Server 502 and server application program 504 together include the components discussed in FIGS. 3 and 4, including language modules, a language module interface program, and a file having a set of variables of which a subset will be text string variables for use by the interpreted language in which an application is written, having been extracted from a local language module file or files. There may also be, depending on the installation, a language module file request generator in communication with multilingual databases 114 and 116.

Server 502 having server application program 504 is connected to network 602, being the same network providing the connection between client machines 100 and 102, and client devices 104 and 106 (as well as any other clients). As in FIG. 5, database machines 114 and 116 may supply server application program 504's language module files. Alternatively, there may be a disk 604 connected to server 502 over connection 606 where previously generated language module files reside. Connection 606, connecting server 502 and disk 604, may be a local bus to which mass storage is attached, a local or private LAN, or a SAN. Depending on the application, these files may have been generated at any time previous to their use, and may include anything from the entire contents of the multilingual database (for small databases designed for limited applications) to a small subset of the available text strings in the database.

The system shown in FIG. 6, as well as similar systems embodying the present invention where there is one network providing connectivity for both clients to server 502 and between server 502 and the multilingual database, yields double benefits. It will reduce or eliminate lag in the servers' response to clients by managing multilingual data through the use of language module files local to itself. In so doing server 502 will reduce network traffic on network 602, thereby reducing resource contention between clients using the network and server 502 using the network. Thus, from the client's perspective server 502's response time is decreased in two ways: reduced time to make use of multilingual support and reduced network traffic which minimizes network delays for all traffic on the network, including the client's.

As will be apparent to those of ordinary skill in the art and with the benefit of the present disclosure that the database systems shown in FIGS. 5 and 6, having exemplar systems 114 and 116 together with disks 510 through 518, may be implemented in a great variety of ways. Depending on the target system and anticipated use, such systems could range from a single database machine with internal disk or disks to a cluster of machines attached to disk farms.

Figure 7:
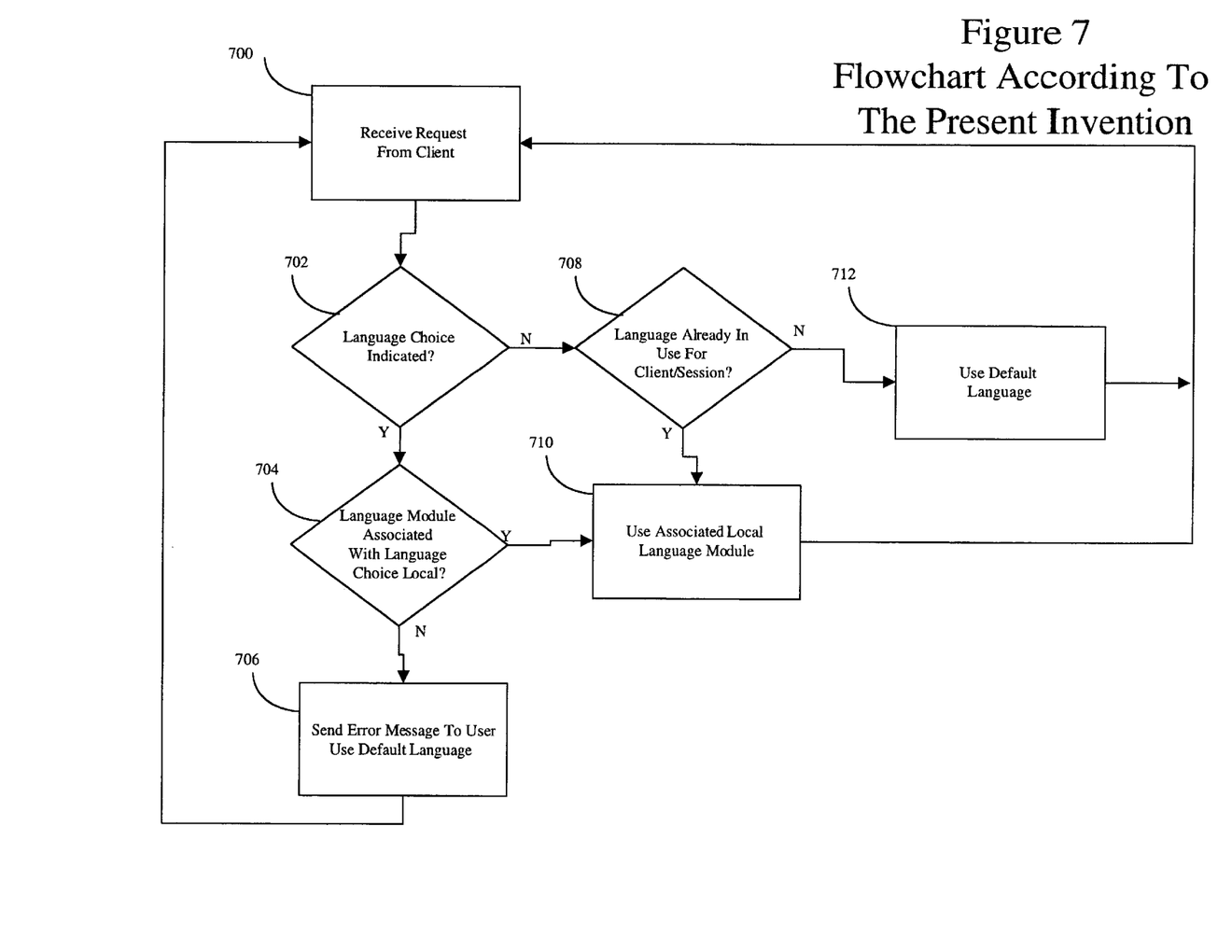
FIG. 7 is a flow chart according to the present invention.

FIG. 7 shows a method for using multilingual support according to the present invention. Block 700 initiates a sequence of actions, starting with a server receiving a request from a client. The request will come into the server over a connecting network between the client and the server. Diamond 702, showing a decision must be made, looks at the information received from the client; the information is parsed for a language choice indicator. If no choice is indicated another decision is made in diamond 708. Diamond 708 checks if there is any language already in use for this session, and if there is no previous language choice the process continues to block 712. Block 712 takes the action of choosing the default language, and any needed strings are retrieved using local variables containing text strings in the default language. After retrieving any needed text strings and satisfying the current client request, the process goes to block 700 and is ready to start on the next request from a client.

If, at diamond 708, there was a language choice previously made and used for this client's session it will be the case that the language strings needed have already been loaded into the local variable file from a local language module file. In this case diamond 708 is exited with a "Yes" to action block 710, where the language variables associated with the language choice are used to fulfill any text string requests. After completing any needed retrievals the process is again at block 700, ready to receive and process the next client request.

If there was a language choice indicated at diamond 702 the process exits through the "Yes" branch and goes to diamond 704. At 704 it is determined if the language module file needed to support the indicated language choice is already local. If it is, the process goes to block 710 where any needed text strings associated with the client's request is fulfilled through the use of text-string variables read into the interpreter's variable set from the local language module file. After the request is handled, the process goes back to block 700 and is ready to receive and process the next client request.

If there is no language module associated with the language choice, the "No" branch is taken out of diamond 704 to block 706. In block 706 the server sends an error message to the client, and makes use of a default language for any needed text strings. After the request is handled, the process goes back to block 700 and is ready to receive and process the next client request.

Figure 8:
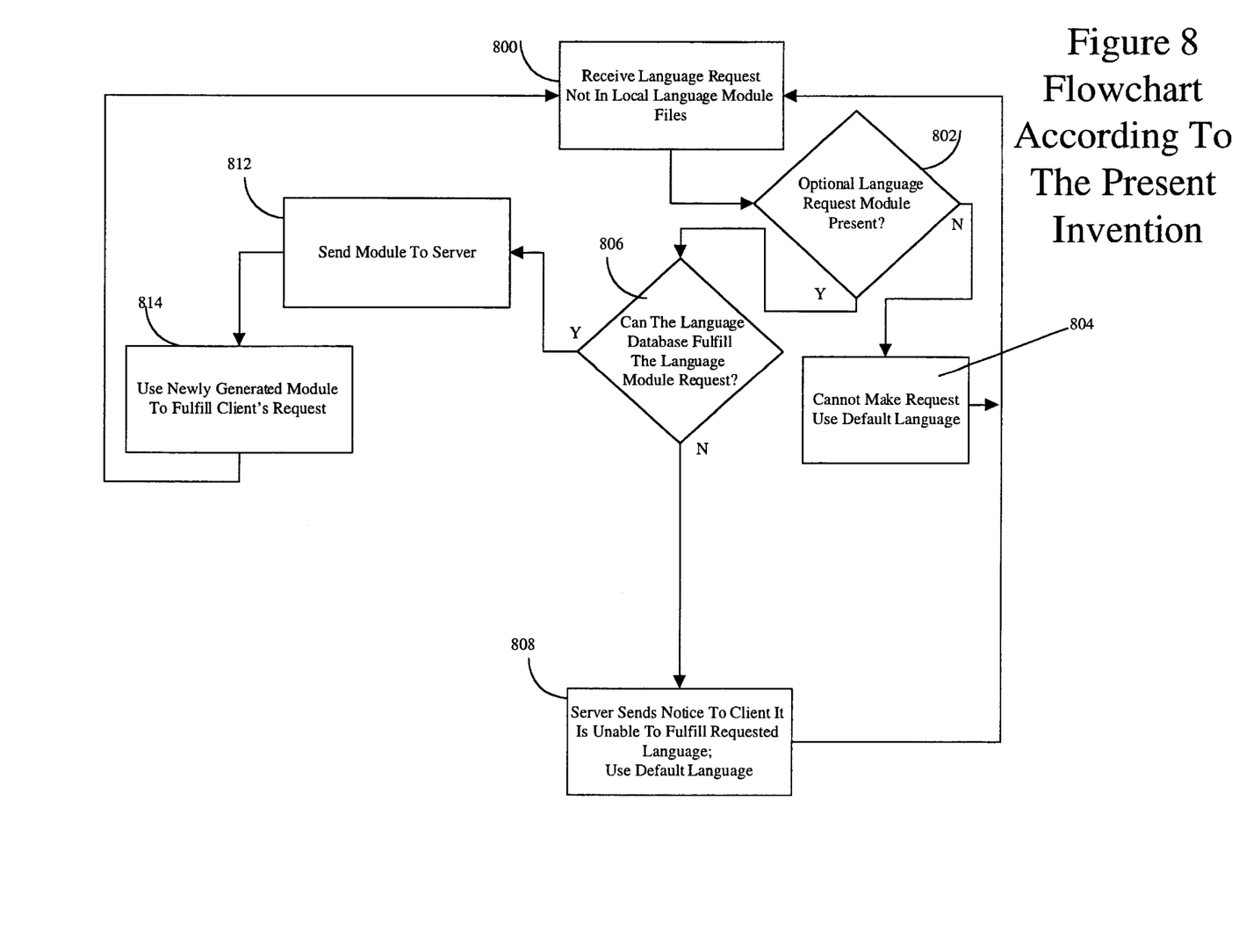
FIG. 8 is a flow chart according to the present invention.

Proceeding now to FIG. 8, box 800 indicates the server application has received a language request from a client that is cannot be satisfied using any locally available language module files. The process goes to diamond 802, which determines if the optional language-module-file-request module is present in this implementation. If it is not, the "NO" exit is taken to box 804. The client's request is handled using a default language for any needed text strings, and the client notified of an error as appropriate for the client application. The process then returns to box 800, ready to receive the next request for a language not in local language module files.

If the optional module is present, then the "YES" exit is taken and diamond 806 entered. If the multilingual database can fulfill the request for a language module, diamond 806 is exited through the "YES" branch and block 812 entered. The requested language module file is sent to the server. After the server has received the requested language module file, block 814 is entered. The server can now fulfill the client's request through the use of the language module file by using the language module interface to read the newly received language module file and put the needed text strings in place in the local variables file. After fulfilling the client's request, the process flows back to box 800, ready to receive another language request not supported by local language module files.

If the result of diamond 806 is "NO", that is, the multilingual database could not fulfill the request from the server, block 808 is entered. The server sends an appropriate message to the client that its language request could not be fulfilled. Any text strings needed to fulfill the current request are taken from a default language, and the process continues to box 800, ready to receive another language request not supported by local language module files.

The present invention has been partially described through the use of a flow chart. As is appreciated by those of ordinary skill in the art and with the benefit of the present disclosure, the procedures described herein may be repeated as continuously, as often, or as little as necessary to satisfy the needs described and details or order of steps may vary without departing from the basic concepts of the present invention.

As will be readily apparent to a person of ordinary skill in the art and having the benefit of this disclosure, there will be a large number of possible ways of representing the data that will be communicated between the multilingual database and the server, and how the data is stored on machine readable media once the data has arrived on the server. All such implementations are contemplated by the present invention, and may be used while staying within the spirit of the disclosure. The present invention also encompasses machine readable media on which are stored embodiments (data and data structures) of the information to be communicated between the multilingual database and the server. It is contemplated that any media suitable for using and retrieving the data and its stored from as data stuctures is whitin the scope of the present invention. Examples would include magnetic, optical, or semiconductor media.

While embodiments and applications of this invention have been shown and described, it will be apparent to those or ordinary skill in the art and with the benefit of the present disclousure that many more modifications than mentioned above are possible without departing from the inventive concepts contained herein. The invention, therefore, is not to be restricted except in the spirit of the associated claims.

What is claimed is:

1. A multilingual server system comprising:
   at least one server;
   a multilingual system disposed within said at least one server further having at least one module written in an interpreted language and at least one language module file containing at least one text string formatted as a variable compatible with said interpreted language;
   a first network connection in operable communication with said multilingual system and a first network; and,
   where said multilingual system is configured to allow operable communication with at least one client, and where said multilingual system is configured to allow operable communication with a multilingual database using said first network connection through said first network, and where said multilingual system is configured to allow operable use of said at least one language module file.

2. The multilingual server system of claim 1 further comprising:
   a second network connection in operable communication with said multilingual server system and a second network; and,
   where said multilingual system is configured to allow operable communication with at least one client using said second network connection through said second network.

3. The multilingual server system of claim 2, where said first network connection and said second network connection are the same network connection.

4. The multilingual server system of claim 2, where said first network and said second network are the same network.

5. The multilingual server system of claim 1 where said first network comprises a WAN, LAN, private LAN, virtual LAN, open LAN, or internet, and said second network comprises a WAN, LAN, private LAN, virtual LAN, open LAN, or internet.

6. In a server application program having at least one module written in an interpreted language and at least one language module file formatted compatibly with the interpreted language, and at least one network connection in operative communication with the server application program and configured to allow operable connection to at least one network, and where the server application program is configured to respond to a client, and where the server application program is configured to interact with a multilingual database through the at least one network connection using the at least one network, a method for supplying multilingual support to the client comprising:
   (a) accepting a request from said client;
   (b) making a language choice based on a language choice indicator if a language choice indicator is included in said request;
   (c) making a language choice based on information available to said server application program if said request includes no language choice indicator;
   (d) coupling said language module file associated with said language choice and said server application program including making the contents of said language module file available as local variables to said at least one interpreted language module; and,
   (e) using said local variables to provide a response to said request.

7. The multilingual support method of claim 6 wherein said making a language choice based on information available to said server application program further comprises:
   (a) creating a history of language choices by correlating at least one request with at least one language choice and further correlating said at least one request with a session indicator;
   (b) using said history of language choices to make a language choice if said request contains no indication of a language choice and said request has a correlation with a session indicator in said history of language choices; and,
   (c) making a language choice if said request contains no indication of a language choice and said request has no correlation with a session number in said history of language choices.

8. The multilingual support method of claim 7 wherein said making a language choice based on information available to said server application program further comprises creating a history of language choices where said correlation of at least on request with at least one language choice comprises correlating a language choice with a language choice indicator contained within said request.

9. The multilingual support method of claim 6 having additional methodology comprising:
(a) detecting if a language module file associated with said language choice is local to said server application program;
(b) issuing a request for a language module file associated with said language choice from said multilingual database if there is no local language file associated with said language choice;
(c) receiving a language module file associated with said language choice from said multilingual database if a request for said language file were made; and,
(d) operatively coupling said server application program and said language module file such that contents of said language module file is made available as local variables to said at least one interpreted language module.

10. In a server having at least one module written in an interpreted language and at least one language module file formatted compatibly with the interpreted language, and at least one network connection in operative communication with the server application program and configured to allow operable connection to at least one network, and where the server application program is configured to respond to a client, and where the server application program is configured to interact with a multilingual database through the at least one network connection using the at least one network, a multilingual support system comprising:
means for receiving a request from said client;
means for making a language choice based on content of said request from said client;
means for coupling said language module file associated with said language choice and said server application program including making the contents of said language module file available as local variables to said at least one interpreted language module; and,
means for using said local variables to provide a response to said request.

11. The multilingual support system of claim 10 further comprising:
means for creating a history of language choices using correlations between at least one request, at least one language choice, and at least one session indicator; and,
means for using said history of language choices to make a language choice for any client request.

12. The multilingual support system of claim 11 wherein said means for making a language choice based on information available to said server application program further comprises creating a history of language choices where said correlation of at least one request with at least one language choice comprises correlating a language choice with a language choice indicator contained within said request.

13. The multilingual support system of claim 10 further comprising:
means for detecting if a language module file associated with said language choice is local to said server application program;
means for generating and sending a request for a language module file associated with said language choice to said multilingual database;
means for receiving a language module file associated with said language choice from said multilingual database; and,
means for operatively coupling said server application program and said language module file where contents of said language module file are formatted to be used as at least one variable to said at least one interpreted language module.

14. The multilingual support system of claim 10 wherein said first network connection and said second network connections are the same network connection.

15. The multilingual support system of claim 10 wherein said first network and said second network are the same network.

16. The multilingual support system of claim 10 wherein said first network comprises a WAN, LAN, private LAN, virtual LAN, open LAN, or internet, and said second network comprises a WAN, LAN, private LAN, virtual LAN, open LAN, or internet.

17. A program storage device readable by a machine, tangibly embodying a program of instructions executable by a machine having at least one module written in an interpreted language and at least one language module file formatted compatibly with the interpreted language, and at least one network connection in operative communication with the server application program and configured to allow operable connection to at least one network, and where the server application program is configured to respond to a client, and where the server application program is configured to interact with a multilingual database through the at least one network connection using the at least one network, to perform a method for supplying multilingual support to the client comprising:
(a) accepting a request from said client;
(b) making a language choice based on a language choice indicator if a language choice indicator is included in said request;
(c) making a language choice based on information available to said server application program if said request includes no language choice indicator;
(d) coupling said language module file associated with said language choice and said server application program including making the contents of said language module file available as local variables to said at least one interpreted language module; and,
(e) using said local variables to provide a response to said request.

18. The program storage device providing multilingual support to a client of claim 17, said method further comprising:
(a) creating a history of language choices by correlating at least one request with at least one language choice and further correlating said at least one request with a session indicator;
(b) using said history of language choices to make a language choice if said request contains no indication of a language choice and said request has a correlation with a session indicator in said history of language choices; and,
(c) making a language choice if said request contains no indication of a language choice and said request has no correlation with a session number in said history of language choices.

19. The program storage device providing multilingual support to a client of claim 18 wherein said making a language choice based on information available to said server application program further comprises creating a history of language choices where said correlation of at least on request with at least one language choice comprises correlating a language choice with a language choice indicator contained within said request.

20. The program storage device providing multilingual support to a client of claim 17, said method further comprising:
(a) detecting if a language module file associated with said language choice is local to said server application program;
(b) issuing a request for a language module file associated with said language choice from said multilingual database if there is no local language file associated with said language choice;
(c) receiving a language module file associated with said language choice from said multilingual database if a request for said language file were made; and,
(d) operatively coupling said server application program and said language module file such that contents of said language module file is made available as local variables to said at least one interpreted language module.

21. The program storage device providing multilingual support to a client of claim 17 wherein said first network connection and said second network connections are the same network connection.

22. The program storage device providing multilingual support to a client of claim 17 wherein said first network and said second network are the same network.

23. The program storage device providing multilingual support to a client of claim 17 wherein said first network comprises a WAN, LAN, private LAN, virtual LAN, open LAN, or internet, and said second network comprises a WAN, LAN, private LAN, virtual LAN, open LAN, or internet.

* * * * *